United States Patent
Hou et al.

(10) Patent No.: US 6,515,965 B1
(45) Date of Patent: Feb. 4, 2003

(54) AVAILABLE BIT RATE FLOW CONTROL FOR SERVICE ALLOCATION IN A PACKET NETWORK

(75) Inventors: Yiwei T. Hou, Santa Clara, CA (US); Shivendra S. Panwar, Freehold, NJ (US); Hong-Yi Tzeng, Tinton Falls, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/277,396

(22) Filed: Mar. 26, 1999

(51) Int. Cl.⁷ .................... G01R 31/08; H04J 3/16; H04L 12/28
(52) U.S. Cl. .................... 370/233; 370/468; 370/395.41
(58) Field of Search .................... 370/468, 229–235, 370/236, 236.1, 400–401, 395.41, 395.43, 230, 231, 232, 233, 395.1, 396, 395.2; 709/227, 226, 232, 235, 228; 710/29

(56) References Cited

U.S. PATENT DOCUMENTS

| | | | | |
|---|---|---|---|---|
| 5,675,576 A | * | 10/1997 | Kalampoukas et al. | 370/232 |
| 6,047,328 A | * | 4/2000 | Charny et al. | 709/232 |
| 6,052,361 A | * | 4/2000 | Ansari et al. | 370/323 |
| 6,072,775 A | * | 6/2000 | Ikeda | 370/236 |
| 6,094,431 A | * | 7/2000 | Yamato et al. | 370/395 |
| 6,185,187 B1 | * | 2/2001 | Ghanwani et al. | 370/232 |

* cited by examiner

Primary Examiner—Kwang Bin Yao
Assistant Examiner—Hanh Nguyen
(74) Attorney, Agent, or Firm—Mendelsohn and Associates PC

(57) ABSTRACT

A packet network employs flow control providing assigned rates to sessions in accordance with a general max-min (GMM) rate allocation. The GMM rate allocation accounts for the minimum cell rate and peak cell rate requirements for each session. For one case, a centralized flow control algorithm is employed that sorts sessions based on increasing minimum cell rate. The centralized flow control algorithm employs an iterative process of increasing the rate of the smallest rate session and adding sessions to the process when the smallest rate session equals the next higher rate session. The rates are increased until the rate either reaches the peak cell rate of the session or the link saturates. For a second case, a distributed flow control algorithm is employed with a distributed protocol within the network to allocate capacity of network links to sessions. For the distributed flow control algorithm, an iterative process of rate allocation uses a modified version of the Consistent Marking method. In the modified version of the Consistent Marking method, a saturated link only marks those sessions reaching a corresponding GMM-bottleneck link rate on links elsewhere in the network. The session traversing its own GMM-bottleneck link is not marked.

17 Claims, 7 Drawing Sheets

```
501  Step 1:End System Processing
502  if Source processing:
503  transmit rate ACR:=ICR,ACR ≥ MCR;
504              If forward direction:
505              CCR:=ACR;MCR:=MCR;ER:=PCR;
506              forward RM cell ←—RM(CCR,MCR,ER) / For every N_rm tramsmitted ATM
507              data cells, the source sends a forward RM cell=RM(CCR,MCR,ER) with:
508              CCR:=ACR;MCR:=MCR;ER:=PCR;*/
509  else
510              If backward direction:
511              Receive backward RM cell=RM(CCR,MCR,ER);
512              ACR:=ER./*Upon the receipt of a backward RM cell=RM(CCR,MCR,ER)
513              from the destination, the ACR of the source is adjusted to ER:*/
514  else
515  if Destination processing:
516  if forward RM cell/* if a forward RM cell is received, then:*/
517              backward RM cell ←—forward RM cell
518              forward backward RM to source.  /*Return forward RM cell as backward RM
519              cell towards the source.*/
```

FIG. 6

601  Step 2: $\mu_\ell$ Calculation
602      if $n_\ell = 0$, then $\mu_\ell := C_\ell$
603      else if $n_\ell = |Y_\ell|$, then
604          $\mu_\ell := C_\ell - \sum_{i \in G_\ell} r_\ell^i + \max_{i \in G_\ell} r_\ell^i$;
605      else {
606          $RC_\ell := C_\ell - \sum_{i \in Y_\ell} r_\ell^i$;
607          if $(RC_\ell < \sum_{i \in U_\ell} MCR^i)$ then $\mu_\ell := 0$;
608          else /* i.e. $RC_\ell \geq \sum_{i \in U_\ell} MCR^i$.*/ {
609              /*Sort unmarked sessions $s \in U_\ell$ in increasing order of their MCRs*/
610              $MCR[1] \leq MCR[2] \leq \ldots \leq MCR[|U_\ell|]$;
611              $k := |U_\ell|$; $\mu_\ell := \dfrac{RC_\ell}{k}$;
612              while $(\mu_\ell < MCR[k])$ {
613                  $RC_\ell := RC_\ell - MCR[k])$ {
614                  $k := k - 1$;
615                  $\mu_\ell := \dfrac{RC_\ell}{k}$;
616              }
617          }
618      }

FIG. 7

```
701    Step 3: Switch Processing
702    Receive a forward RM cell=RM(CCR, MCR, ER) from the source of session i{
703        if RM cell signals session exit{
704            G_ℓ := G_ℓ-{i}; n_ℓ:=n_ℓ-1;
705            table_update ();
706        }
707        if RM cell signals session initiation{
708            G_ℓ := G_ℓ∪{i}; n_ℓ:=n_ℓ+1;
709            b_ℓ^i:=0;     r_ℓ^i:=CCR;    MCR^i:=MCR;
710            table_update ();
711        }
712        else/*i.e. RM cell belongs to an ongoing session. */{
713            r_ℓ^i:=CCR;  if ( r_ℓ^i<μ_ℓ ) then    b_ℓ^i:= 1;
714            table_update ();
715        }
716        Forward the forward RM cell RM(CCR, MCR, ER) towards its
717 destination;
718    }
719    Receive a backward RM cell RM(CCR, MCR, ER) from the destination of
720 session i{
721            ER:=max{min{ER, μ_ℓ},MCR};
722            Forward the backward RM cell RM(CCR,MCR,ER) towards its source;
723    }
724    table_update ();
725        {
726            rate_calculation_1; go to Step 2 to calculate advertised rate μ_ℓ^1;
727            Unmark any marked session i ∈G_ℓ at link ℓ with r_ℓ^i≥μ_ℓ^1 ;
728            rate_calculation_2: go to Step 2 to calculate advertised rate μ_ℓ;
729            if ( μ_ℓ<μ_ℓ^1 ), then{
730                Unmark any marked session i ∈G_ℓ at link ℓ with r_ℓ^i≥μ_ℓ ;
731                rate_calculation_3: go to Step 2 to calculate advertised rate μ_ℓ again;
732            }
733    }
```

FIG. 10

AVAILABLE BIT RATE FLOW CONTROL FOR SERVICE ALLOCATION IN A PACKET NETWORK

BACKGROUND OF THE INVENTION

1. Field of the Invention

The present invention relates to routing of packets in a telecommunications network, and, more particularly, to allocating bandwidth capacity between nodes of a packet network using flow control for routing of packets.

2. Description of the Related Art

Service providers provision and maintain packet networks for clients having a variety of voice and data needs. For example, virtual private networks (VPNs) allow service providers to establish and tear down connections for a large number of users while only billing a single client. Each of these connections, which may be termed a session, may comprise a stream of packets, or packet flow, traversing links of the network. However, the client may require a certain amount of guaranteed bandwidth, minimum transport delay, or other metric for some or all of the packet flows transported through the network for a session. Routing methods may determine paths through links of the network and allocate portions of the corresponding bandwidth of the links to the sessions.

Network operators may commit to certain levels of service for sessions, such as guaranteed minimum available bandwidth or maximum packet-loss probability. Some networks, particularly high-speed networks, may support the networking protocol known as asynchronous transfer mode (ATM) in which data are transmitted as packets (termed "cells") through a logical path. Such high-speed networks typically carry multiple services having different traffic characteristics, including both constant bit rate traffic and variable bit rate traffic. One type of service provided in ATM networks is the available bit rate (ABR) service. Bandwidth commitments for the ABR service may include: 1) a minimum cell rate (MCR) available to a service (i.e., the least bandwidth that the network may allocate to a service), and 2) a peak cell rate (PCR) that the service may transmit cells (i.e., the maximum bandwidth that the network may allocate to a service). However, the network may require a mechanism for allocating bandwidth to the sessions sharing the total capacity of a link.

Figure 1:
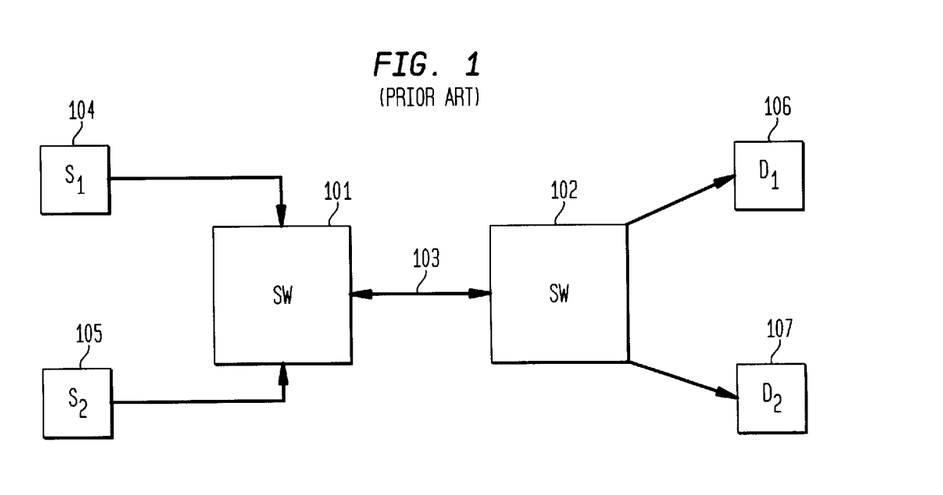
FIG. 1 illustrates a network employing a classic max-min policy of the prior art for rate allocation.

Packet networks of the prior art have employed a classic max-min (rate-allocation) policy as a mechanism for sharing bandwidth of the network for the ABR service. A max-min policy maximizes the minimum available bandwidth (i.e., cell rate) assigned to a session. FIG. 1 illustrates a network with sources $S_1$ 104 and $S_2$ 105 each establishing a point-to-point connection (session) with corresponding destinations $D_1$ 106 and $D_2$ 107. The bandwidth capacity for the connections passing through a link 103 between switches (SWs) 101 and 102 is shared. For the classic max-min policy, users that correspond to the source-destination pairs ($S_1$ 104 and $D_1$ 106) and ($S_2$ 105 and $D_2$ 107) each receives the same service level commitments from the service provider.

Each of the sources $S_1$ 104 and $S_2$ 105 initiating a session sends a request to the corresponding destination $D_1$ 106 or $D_2$ 107 to reserve bandwidth of the link 103 through which the connection passes. In ATM networks, this request is referred to as a resource management (RM) cell. The forward RM cell (from source to destination) contains the MCR and PCR values and an explicit cell rate (ER) set to the PCR value. A backward RM cell (from destination to source) contains the ER set to the assigned cell rate (i.e., allocated bandwidth). Typically, the bandwidth allocated to a connection by SWs 101 and 102 for each source-destination pair is the available bandwidth (remaining capacity) of link 103 divided by the number of connections. This classic max-min policy works well for a network when each session's MCR is zero and each session's PCR is greater than or equal to the link rate. However, for the general case of multiple users having different commitments for MCR/PCR, the classic max-min policy no longer determines rate allocation sufficiently since the classic max-min policy does not account for either the MCR or PCR of a user's connection.

Other networks of the prior art providing ABR services may employ distributed algorithms to provide a max-min rate allocation for a sharing mechanism. In particular, the Consistent Marking method (outlined subsequently) for a distributed algorithm converges to the classical max-min policy through distributed and asynchronous iterations. The Consistent Marking method is described in, for example, A. Charny, D. Clark, and R. Jain, "Congestion Control with Explicit Rate Indication," *Proc. IEEE ICC'95* (1995) pp. 1954–1963.

According to the Consistent Marking method, each switch (e.g., SW 101 and 102 of FIG. 1) monitors the cell traffic traversing through the switch by keeping track of the state information of each session. Also, each output port of switches 101 and 102 maintains a variable, the advertised rate $\mu$, to calculate available bandwidth (capacity) for each connection. An algorithm employing Consistent Marking method operates as follows.

When a forward RM cell arrives at SW 101, for example, the current cell rate (CCR) value of the session is stored in a virtual circuit (VC) table. If this CCR value is less than or equal to the current advertised rate $\mu$, then the session is assumed to be in a bottlenecked state (i.e., the session cannot increase its cell rate because link capacity is unavailable), either at the link of the switch or at a link elsewhere within the network. Initially, the current advertised rate is set to the capacity of the link divided by the number of sessions traversing the link. A bit associated with this session is set (marked) within the VC table (the session having the corresponding VC table bit set is termed a "marked session"). The advertised rate $\mu$ for the link is then calculated as given by equation (1):

$$\text{Advertised Rate } \mu = \frac{C_l - \sum \text{Rates of marked connections}}{n_l - \sum \text{Marked connections}} \quad (1)$$

where $C_l$ is the capacity of link l and $n_l$ is the number of connections of link l. The switch sets the ER field of the forward RM cell of the marked session to the calculated advertised rate $\mu$. The advertised rate $\mu$ is continuously re-calculated as sessions are initiated, terminated, or updated.

For each re-calculation, the algorithm using the Consistent Marking method examines the entries of sessions in the VC table. For each marked session, if the recorded CCR of the marked session in the VC table is larger than the newly calculated advertised rate $\mu$, the associated bit for the session is reset (the session is "unmarked") and the advertised rate $\mu$ is calculated again. Consequently, the ER field of the forward RM cell is set by the switches to the minimum of all advertised rates along the links traversed by the connection. The destination then returns a backward RM cell to the source with this ER value. Upon convergence of the Consistent Marking method, each session is allocated with a rate according to the max-min policy, and is marked along every link the session traverses. However, this method does not effectively account for the MCR and PCR of each session.

SUMMARY OF THE INVENTION

The present invention relates to allocating capacity of one or more links of a network by a router to a packet flow of at least one session, each session having a minimum rate and a peak rate. In accordance with the present invention, each session is initially assigned a rate based on the minimum rate of the session. A session is selected based on the initially assigned rate. An iterative procedure then increases the rate of the session if an available capacity of the link exists, and then determines whether the rate of the session that has been increased is equal to the corresponding peak rate of the session or the available capacity of the link. If the session that has been increased is equal to the corresponding peak rate of the session, then the rate of the session is set. If the session that has been increased is equal the available capacity of the link, then the rates of all sessions are set. The iterative procedure repeats for each of the sessions not having a set rate until all rates of the sessions are set, thereby maximizing the minimum rate assigned to each session of the link.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with the present invention, a flow control algorithm allocates capacity of links of a packet network to sessions based on minimum and peak cell rates of the session to provide a generalized max-min (GMM) rate allocation. Design of such distributed algorithm provides a generalized max-min (GMM) rate allocation (i.e., GMM policy) of link capacity for sessions of, for example, an available bit rate (ABR) service. T two embodiments of the present invention are described, and may be implemented by a processor and related processing modules of the router. A first embodiment of the present invention may be employed when information of link capacity, link utilization, and session characteristics is available to a central processor, such as a network management system. A second embodiment of the present invention may be employed when information of link capacity, link utilization, and session characteristics is distributed throughout a network.

Figure 2:
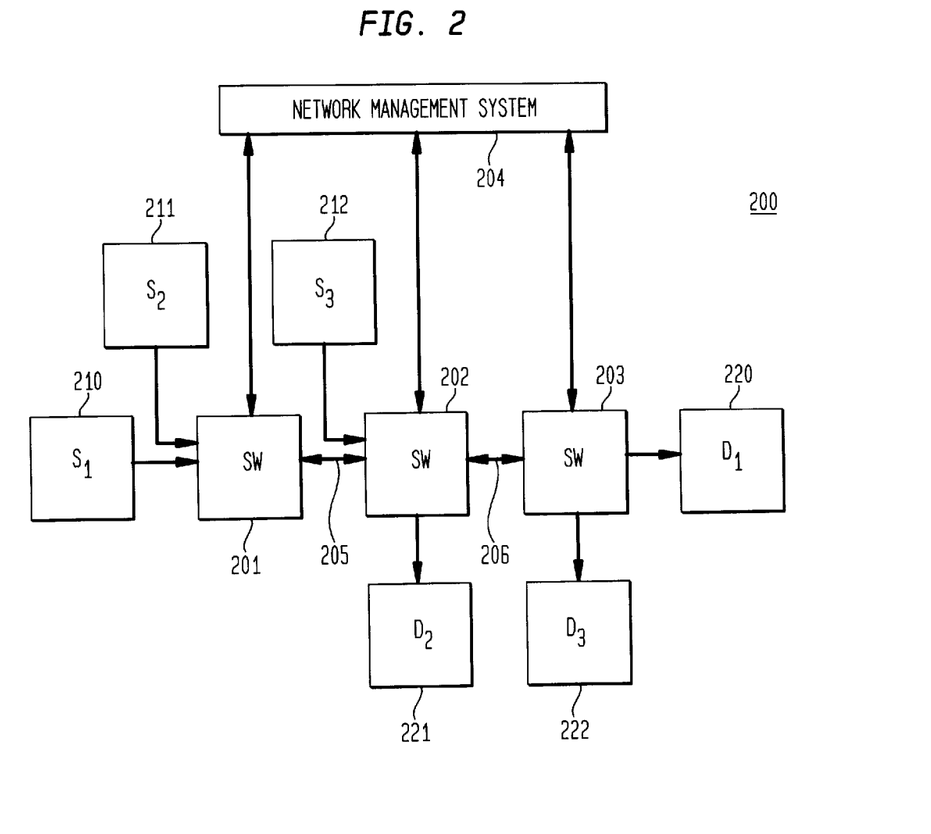
FIG. 2 shows a network employing a flow control algorithm in accordance with the present invention.

FIG. 2 shows a network 200 employing the flow control algorithm in accordance with the present invention. Network 200 comprises switches (SWs) 201, 202, and 203; sources $S_1$ 210, $S_2$ 211, and $S_3$ 212; and destinations $D_1$ 220, $D_2$ 221, and $D_3$ 222. The SWs 201, 202, and 203 are interconnected by network links 205 and 206, which may be wired DSIs, optical SONET, or other high-bandwidth links supporting multiplexed user connections. For the preferred embodiments described herein, the links 205 and 206 support packet transmission as cells in accordance with the Asynchronous Transfer Mode (ATM) standard, although the present invention is not so limited and may in general be applied for rate allocation in other types of packet networks. A session with destination $D_1$ 220 is initiated by source $S_1$ 210, and the session includes cells of source $S_1$ 210 exchanged with destination $D_1$ 220. The cells of source $S_1$ 210 are received by SW 201, traverse through SW 202 (via links 205 and 206), and are provided to destination $D_1$ 220 by SW 203. Links 205 and 206 may further transfer cells of sessions between source-destination pairs $S_2$-$D_2$ and $S_3$-$D_3$.

SWs 201, 202, and 203 may be coupled to an optional network management system (NMS) 204. NMS 204 collects network topology information, link status and utilization information, and each user's session information ("global information"). The NMS 204 may allocate to each session a portion of the capacity (e.g., bandwidth) of network links 205 and 206 based on the global information.

A network, such as network 200, may be characterized by a set of N interconnecting nodes (e.g., ATM switches) with a set of L links (N and L integers greater than zero). A session s of the set S of sessions (i.e., s∈S) traverses one or more links l in the set L of links (i.e., l∈L), and the session s is allocated a specific rate $r_s$ (l, s, and S integers greater than zero). The aggregate allocated rate $F_l$ on link l of the network is given by equation (2):

$$F_l = \sum_{s \in S traversinlink l} r_s \quad (2)$$

The total capacity of link l is defined as $C_l$. A link l is saturated or fully utilized if the aggregate allocated rate $F_l$ is equivalent to $C_l$. The values $MCR_S$ and $PCR_S$ are, respectively, the minimum cell rate (MCR) and the peak cell rate (PCR) requirements for session s (s∈S). The sum of the $MCR_S$ values for all sessions traversing a link l is not greater than the capacity $C_l$ of link l. The requirement for this sum may be enforced by admission control when a session is initiated to determine whether or not to accept a new session. A rate vector r is defined by the set of specific rates $r_S$ of each session s (i.e., r={$r_s$|s∈S}. The rate vector r is termed Available Bit Rate (ABR)-feasible if the following two constraints are satisfied: 1) $MCR_S \leq r_S \leq PCR_S$ for all s∈S; and 2) $F_l \leq C_l$ for all l∈L.

Centralized Flow Control

Figure 3:
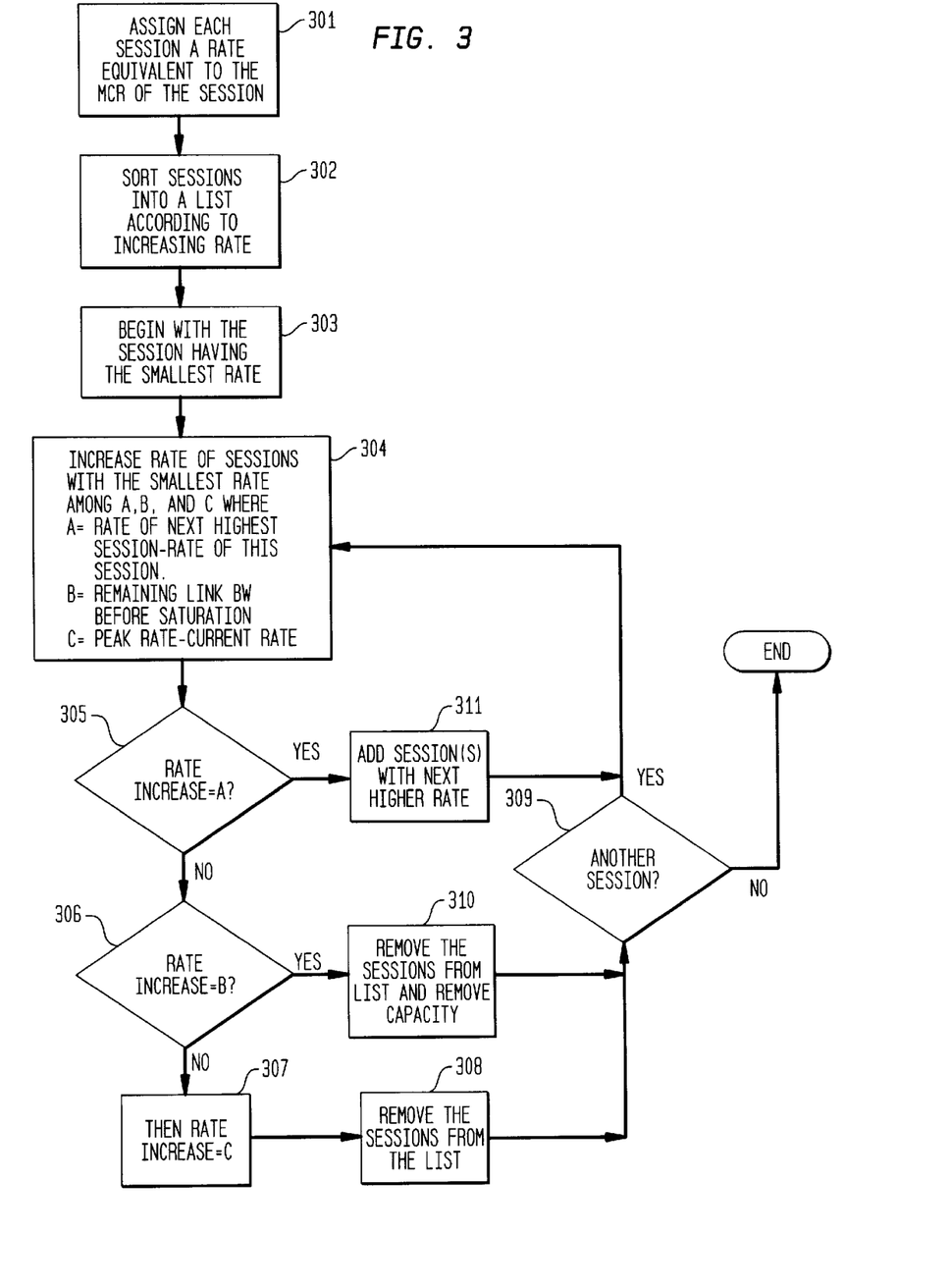
FIG. 3 shows an exemplary centralized flow control algorithm of the present invention.

For a first embodiment, flow control of the present invention is employed in a network in which a centralized processor, such as the NMS 204 of FIG. 2, is present and may be employed to centrally allocate capacity of network links to sessions by using the global information. The first embodiment, termed a central flow control algorithm, employs an iterative process to provide for a GMM rate allocation. FIG. 3 shows an exemplary centralized flow control algorithm for the first embodiment. The algorithm as shown in FIG. 3 may be implemented by a centralized processor and applied to a network of N nodes with an arbitrary number S of sessions if the rate vector r is ABR-feasible (i.e., $MCR_S \leq r_S \leq PCR_S$ for all $s \in S$; and $F_l \leq C_l$ for all $l \in L$).

At step 301, each session s is assigned a rate equivalent to its corresponding $MCR_S$. At step 302, the sessions are sorted in order of increasing MCR to produce a list of sessions. At step 303, the session having the smallest rate is selected (if more than one session have the same lowest rate, all such sessions are selected). The algorithm then proceeds to step 304 to begin an iterative process.

At step 304, the rate assigned to the session(s) having the smallest rate among all sessions is increased. The rate increase may either be continuous or in discrete increments. After the rate is increased, at step 305 the algorithm tests whether the rate of the session(s) selected in step 304 has reached the second smallest rate among the sessions in the list. If the test of step 305 is yes, then the session with the second smallest rate is added in step 311 to the session(s) that have their rate increased in step 304. The algorithm then proceeds from step 311 to step 304. If the test of step 305 is no, the algorithm proceeds to step 306.

In step 306, a test determines whether the capacity of the link has been reached, causing the link to saturate. If the link is saturated, then the algorithm proceeds to step 310. At step 310, the sessions are removed from the list and the network capacity associated with such sessions is removed (i.e., marked as unavailable for network use). Step 309 tests whether any sessions remain in the list. If the test of step 309 is yes, the algorithm returns to step 304 to repeat the iterative process. If the test of step 309 is no, the algorithm ends. If the test of step 306 determines that no link is saturated, the algorithm proceeds to step 307.

At step 307, each session that has its assigned rate increased is compared with the corresponding $PCR_S$ for the session. Step 307 is reached when the tests of both steps 305 and 306 return a no and sets the rate of the session to its $PCR_S$. At step 308 the session is removed from the list and the network capacity associated with such session is removed. Step 309 then tests whether any sessions remain in the list. If the test of step 309 is yes, the algorithm returns to step 304. If the test of step 309 is no, the algorithm ends.

The first embodiment shows that the generalized max-min (GMM) rate allocation of the present invention maximizes the minimum rate among all sessions, while satisfying each session's MCR and PCR requirements. However, the centralized flow control algorithm of FIG. 3 for the GMM rate allocation requires global information of, for example, a central processor such as NMS 204 of FIG. 2. For the general case of multiple sub-networks interconnected as a large network, global information may be difficult to collect and difficult to maintain and manage within a database.

A rate vector r is a Generalized Max-Min (GMM) rate vector if (1) the rate vector r is ABR-feasible, and (2) for every $s \in S$ and every ABR-feasible rate vector $\hat{r}$ in which each element $\hat{r}_S$ is greater than the corresponding element of rate vector r (i.e., $\hat{r}_S > r_S$), there exists some session t, $t \in S$, such that $r_S \geq r_t$ and $r_t > \hat{r}_t$. Given an ABR-feasible rate vector r, a link $l \in L$ is defined as a GMM-bottleneck link with respect to r for a session s traversing l if $F_l = C_l$ and $r_S \geq r_t$ for every session t traversing link l for which $r_t > MCR_t$. An ABR-feasible rate vector r is a GMM rate vector if and only if each session has either a GMM-bottleneck link with respect to r or a rate assignment equal to its PCR. As would be apparent to one skilled in the art, there exists a unique GMM rate vector r that satisfies the GMM rate allocation.

A GMM-bottleneck link rate may be defined as follows. First, an indicator function $1^+\{event\ A\}$ is defined as given in equation (3):

$$1^+\{event\ A\} = \begin{cases} 1 & \text{if event } A \text{ is true;} \\ 0 & \text{otherwise.} \end{cases} \quad (3)$$

Given a GMM rate vector r, a link l ($l \in L$) may be a GMM-bottleneck link with respect to r, and the GMM-bottleneck link rate at link l may be denoted as $\tau_l$. In accordance with the present invention, the GMM-bottleneck link rate $\tau_l$ may be calculated as given in equation (4):

$$\tau_l \cdot \sum_{i \in U_l} 1^+\{MCR^i \leq \tau_l\} + \sum_{i \in U_l} MCR^i \cdot 1^+\{MCR^i > \tau_l\} = C_l - \sum_{i \in \gamma_l} r_l^j \quad (4)$$

where $U_l$ denotes the set of sessions that are GMM-bottlenecked at link l, and $\gamma_l$ denotes the set of sessions that are either GMM-bottlenecked on links elsewhere within the network or have a rate allocation equal to their PCRs, and $r_l^i < \tau_l$ for $i \in \gamma_l$.

For the special case when the minimum cell rate $MCR_S$ is zero for every session $s \in S$ the GMM-bottleneck link rate $\tau_l$ in equation (4) is as given in equation (5):

$$\tau_l \cdot |U_l| = C_l - \sum_{i \in \gamma_l} r_l^j, \text{ or } \tau_l = \frac{C_l - \sum_{i \in \gamma_l} r_l^j}{|U_l|} \quad (5)$$

where $|U_l|$ denotes the number of sessions bottlenecked at link l. Equation (5) gives the max-min bottleneck link rate at link l for the classic max-min case.

Given the centralized flow control algorithm as described with respect to FIG. 3 and the GMM-bottleneck link rate $\tau_l$ as given in equation (4), the GMM rate allocation for a session $s \in S$ converges and may be a rate equal to 1) its MCR, 2) its PCR, or 3) its GMM-bottleneck link rate.

Distributed Flow Control

For a second embodiment, flow control of the present invention employs a distributed protocol within the network to allocate capacity of network links to sessions. For the second embodiment, termed a distributed flow control algorithm, the algorithm also employs an iterative process of rate allocation with a marking method employing a generalized form of the Consistent Marking method.

A distributed protocol may be employed to provide signals between the sources, destinations, and network elements (e.g., ATM switches) for GMM rate allocation in accordance with the present invention. In particular, such signals provide for (1) an exchange of source and link information between a source and the network element(s), and (2) rate adaptation by the source upon receiving feedback signals generated by the network element(s).

Figure 4:
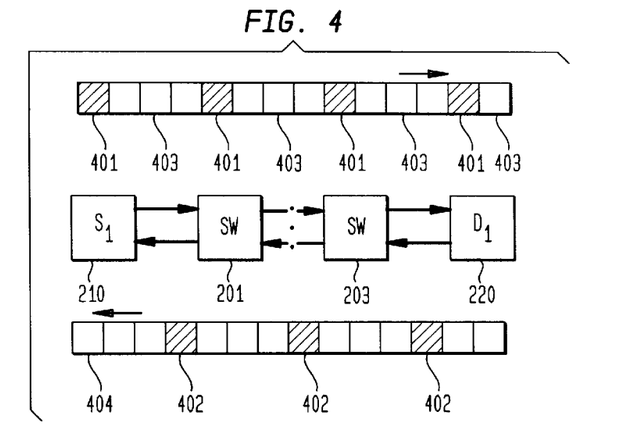
FIG. 4 shows a session for the network of FIG. 2 having cell streams including Resource Management cells as employed with the present invention.

The distributed flow control algorithm of the second embodiment provides for such signals of a distributed protocol using an available bit rate (ABR) mechanism. Resource Management (RM) cells are inserted among data cells to exchange information between a source and the network. FIG. 4 shows a session for the source-destination pair $S_1$-$D_1$ through SW 201 to SW 203 comprising a forward cell stream 403 and backward cell stream 404. The source sets the field values of each forward RM cell 401 between data cells 403 so as to provide the network elements (e.g., SWs 201, 202, and 203) with rate information of the source (e.g. MCR, PCR, CCR). The network elements set the ER field of each backward RM cell 402 to inform the source about available bandwidth. For source rate adaptation, the source adjusts its transmission rate of data based on the information received from each backward RM cell.

The distributed flow control algorithm for the GMM rate allocation employs a modification to the Consistent Marking algorithm for the classic max-min policy. In accordance with the GMM rate allocation of the present invention, the calculation of the advertised rate $\mu$ given in equation (1) is modified to reflect the GMM-bottleneck link rate defined in equation (4), thereby basing rate allocation on the MCR and PCR of a session. Furthermore, in accordance with the GMM rate allocation of the present invention, sessions are only marked when the rate of the session is strictly less than the calculated advertised rate. Therefore, the advertised rate $\mu$ is calculated as the GMM-bottleneck link rate of equation (4), and an exemplary method of calculating the advertised rate $\mu$ may be as shown in FIG. 6, described subsequently.

Each switch monitors its traffic by keeping track of the state information of each traversing connection. Also, each output port of a switch maintains a variable for the advertised rate $\mu$ to calculate available bandwidth for each connection. Initially, the current advertised rate is set to a predefined value, which may be determined by techniques well known in the art, or may be set to the capacity of the link divided by the number of sessions. When a forward RM cell arrives at SW 201, for example, the current cell rate (CCR) value and the minimum cell rate (MCR) values of the connection are stored in a virtual circuit (VC) table. If the CCR value is less than the current value for the advertised rate $\mu$, then the connection may have a rate equivalent to the GMM-bottleneck link rate, either at the link of the switch or at a link elsewhere within the network. In that case, a bit associated with this connection is set (marked) within the VC table. The connection with the corresponding VC table bit set is termed a "marked session". The advertised rate $\mu$ is then calculated, such as by the method described below with respect to FIG. 6, and the ER field of the backward RM cell of the marked session is set to the calculated advertised rate $\mu$.

For a saturated link, only sessions reaching their GMM-bottleneck link rate on links elsewhere in the network are marked (i.e., a session traversing its own GMM-bottleneck link is not marked at this link). In addition, for every session s∈S the allowed cell rate (ACR) of the source and the CCR value in the forward RM cell are ABR-feasible (i.e., ($MCR_S \leq ACR_S \leq PCR_S$) and ($MCR_S \leq CCR_S \leq PCR_S$)).

Figure 5:
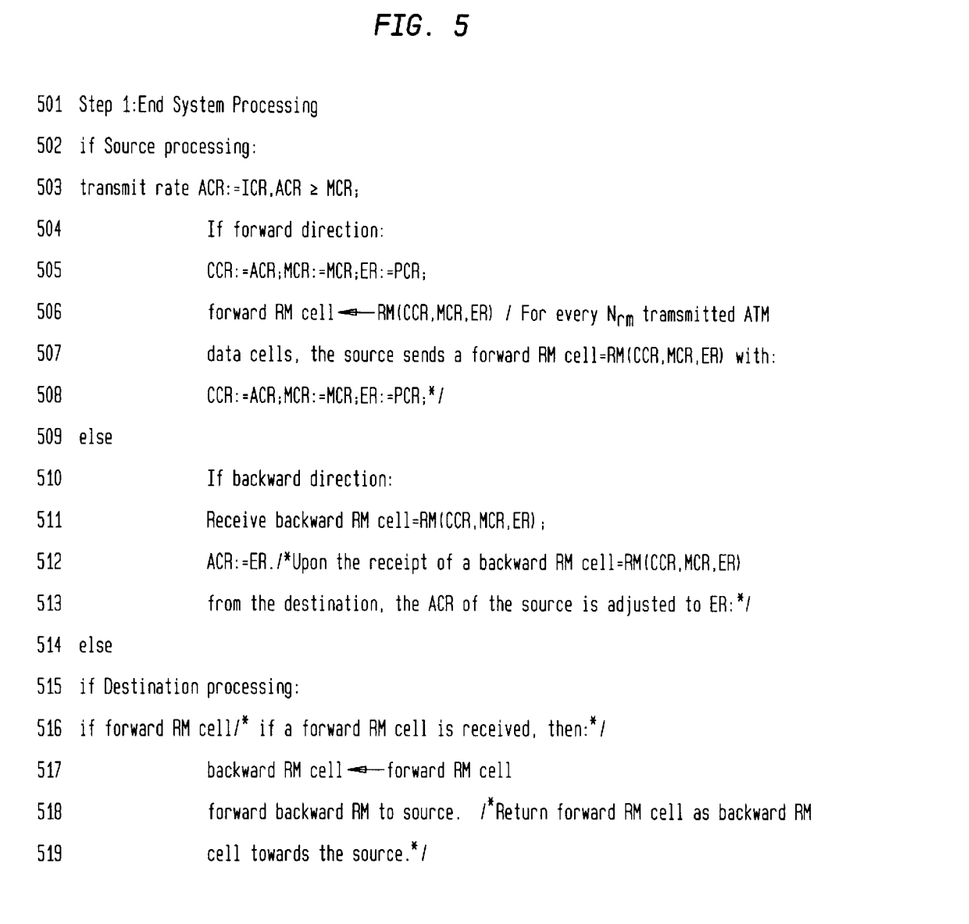
FIG. 5 shows the pseudo-code for processing by an end system in accordance with an exemplary distributed flow control algorithm of the present invention.
Figure 6:
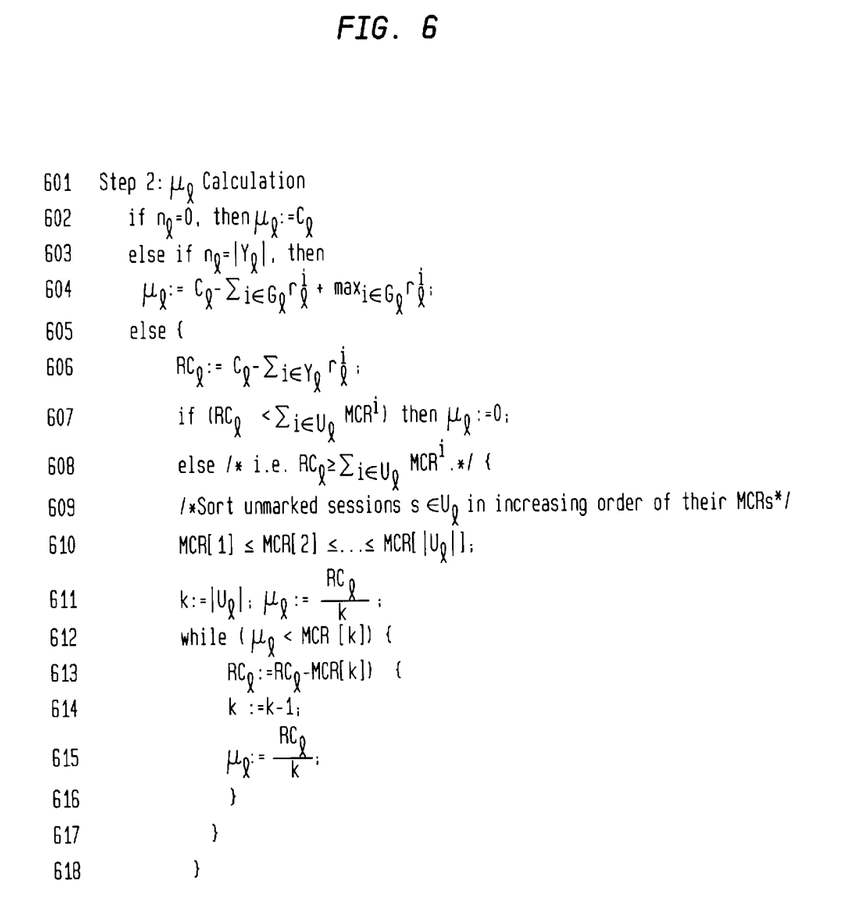
FIG. 6 shows pseudo-code for calculation of advertised rate in accordance with the exemplary distributed flow control algorithm of the present invention.
Figure 7:
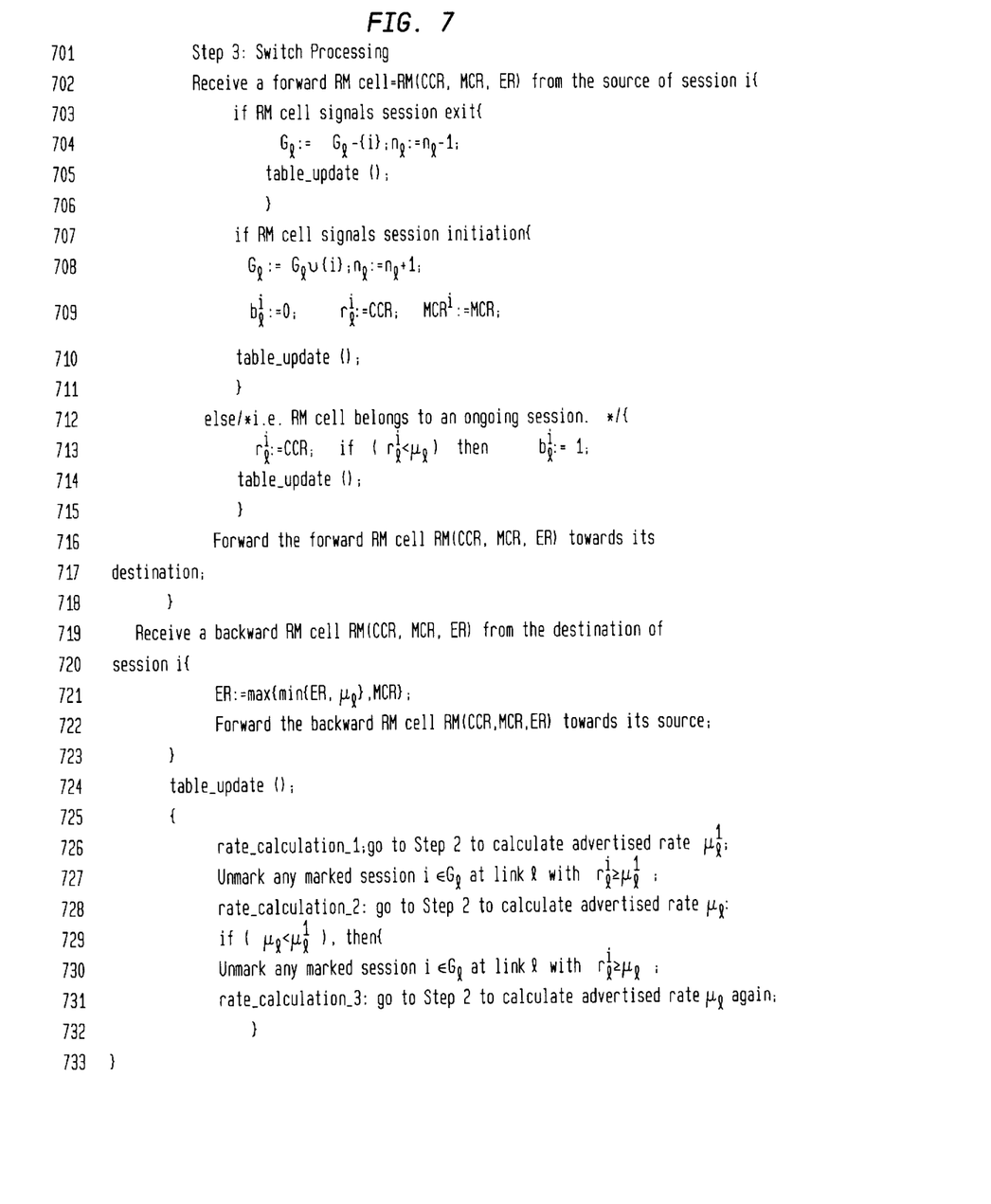
FIG. 7 shows pseudo-code for processing by a switch in accordance with the exemplary distributed flow control algorithm of the present invention.

FIGS. 5, 6, and 7 show pseudo-code of an exemplary implementation of the distributed flow control algorithm of the present invention. FIG. 5 shows pseudo-code for end processing by a node including source processing and destination processing. FIG. 6 shows pseudo-code for advertised rate calculation. FIG. 7 shows pseudo-code for switch processing. The pseudo-code of both FIGS. 6 and 7 may be employed by, for example, an ATM switch.

FIG. 5 shows the pseudo-code for the end processing that defines end system actions (the actions of the source and destination) in accordance with the distributed flow control algorithm of the present invention. After beginning at line 501, the end system may begin either source processing at line 502 or destination processing at line 515, depending on the session. Initially, at line 503, the source processing causes the end system to transmit at a rate defined as the allowed cell rate (ACR), set to an initial cell rate (ICR) (a predetermined or predefined quantity). For the forward direction (line 504), the source processing then sets the field values of the forward RM cell (RM(CCR,MCR,ER)) as follows: CCR to the ACR (which is the ICR), MCR to the MCR of the session, and ER to the PCR of the session (line 505). Each forward RM cell (e.g., every $N_{rm}$ ATM data cells, with $N_{rm}$ an integer) is periodically sent having these field values (lines 506–508). When the source processing receives a backward RM cell (line 510), the field value for ER is extracted (line 511). The transmitted rate of ACR is then set to the field value of ER extracted from the received backward RM cell (lines 512–513).

If the session requires the end system to provide destination processing (line 515), the destination processing receives a forward RM cell from some source (line 516). The destination processing sets the backward RM cell (including all field values) as the received forward RM cell (line 517). The destination processing then causes the end system to transmit the backward RM cell toward the source (lines 518–519). Since an end system may be both a source and a destination of different sessions, the pseudo-code of FIG. 5 illustrates that the end system may provide both types of source and destination processing depending on the characteristics of the session.

The following definitions are employed for the link parameters and other variables of the exemplary pseudo-code of FIGS. 6 and 7:

$C_l$: Capacity of link l∈L.

$RC_l$: Variable representing the remaining capacity at link l $G_l$: Set of sessions traversing link l∈L.

$n_l$: Number of sessions in $G_l$, l∈L, i.e., $n_l = |G_l|$.

$r_l^i$: The current cell rate (CCR) value of session i∈$G_l$ at link l.

$MCR^i$: The MCR requirement of session i.

$b_l^i$: The bit employed for marking session i∈$G_l$ at link l. with:

$b_l^i = \begin{cases} 1 & \text{if session } i \in Gl \text{ is marked at link } l; \\ 0 & \text{otherwise.} \end{cases}$ $\gamma_l$: Set of sessions marked at link l, i.e.

$\gamma_l = \{i | i \in G_l \text{ and } b_l^i = 1\}$ $U_l$: Set of sessions unmarked at link l, i.e., $U_l = \{i | i \in G_l \text{ and } b_l^i = 0\}$, and $Y_l \cup U_l = G_l$.

Note that each link e∈L is initialized with: $G_l = \phi$(null set); $n_l = 0$; $\mu_{l=Cl}$.

FIG. 6 shows pseudo-code for advertised rate calculation. The algorithm is called and begins at line 601. If no sessions traverse the link l (case 1), then the advertised rate $\mu_l$ of link l is set to the capacity of the link (line 602). In addition, if the number of sessions that traverse link l is the number of marked sessions (case 2) (line 603), then the advertised rate $\mu_l$ is set to the capacity of the link minus the total capacity of the CCRs of the sessions traversing the link l plus the maximum capacity of a session (line 604). This corresponds to the converged state of the distributed flow control algorithm with no session being initiated or terminated. Otherwise (i.e., neither case 1 or case 2), the advertised rate $\mu_l$ is calculated as shown in lines 605 through 618.

First, the remaining capacity at link l is calculated as the capacity at link l minus the sum of all current cell rates (CCRs) of the marked sessions traversing link l (line 606). If the remaining capacity at link l is less than the sum of all minimum cell rates for the sessions that are unmarked at link l, then the advertised rate $\mu_l$ is set to zero (line 607). Otherwise(line 608), the unmarked sessions at link l are sorted based on their increasing order of MCR value (lines 609–610). A counting variable k is initialized with the value equivalent to the number of unmarked sessions, and the advertised rate $\mu_l$ is initially set to the remaining capacity divided by the number of unmarked sessions (line 611). An iterative loop then determines the new value for the advertised rate $\mu_l$ (lines 612–616).

The iterative loop reduces the remaining capacity by the highest MCR of the unmarked sessions pointed to by the counter k (line 613), decrements the counter k (line 614), and then recalculates the advertised rate $\mu_l$ as the remaining capacity divided by the current counter value for k (line 615). The iterative loop repeats until the advertised rate $\mu_l$ is greater than or equal to the current MCR value pointed to by the counter k (of the unmarked sessions) (line 612). The value provided as the advertised rate $\mu_l$ is the value calculated in the final iteration of the loop.

FIG. 7 shows pseudo-code for switch processing of the distributed flow control algorithm of the present invention. The algorithm begins at line 701, and two cases are considered. The first case is of a forward RM cell that is received from an end system (lines 702–718), the end system performing source processing as shown in FIG. 5. The second case is of a backward RM cell that is received from an end system (lines 719–723), the end system performing destination processing as shown in FIG. 5. Also shown in FIG. 7 is a subroutine, table_update, that is employed by the switch processing for the first case in which the advertised rate is calculated and the VC table updated (lines 724–733).

For the first case, the switch receives a forward RM cell for session i from a source (line 702). If the RM cell indicates that the session is being terminated (line 703), then the session i is removed from the set of sessions traversing link l (line 704), and the number of sessions traversing link l is reduced by one (line 704). The VC table is updated accordingly (line 705), by calling the table_update subroutine for calculating a new value for the current advertised rate $\mu_l$ and unmarking bit values of affected sessions. If the RM cell indicates that the session i is being initiated (line 707), then the session i is added to the set of sessions traversing link l (line 708), and the number of sessions traversing link l is increased by one (line 708). In addition, the bit used to mark the session is set to 0 (unmarked), the variable corresponding to the CCR value of the session is set to the CCR field value of the forward RM cell, and the MCR value of the session i is set to the MCR field value of the forward RM cell (line 709). The VC table is updated accordingly by calling the table_update subroutine (line 710).

If the RM cell is of an ongoing session i (line 712), the variable corresponding to the CCR of the session is set to the CCR field value of the forward RM cell (line 713). If the newly set variable corresponding to the CCR of the session is less than the current advertised rate $\mu_l$, the bit used to mark the session is set to 1 (marked) (line 713). The VC table is updated accordingly by calling the table_update subroutine (line 714). The algorithm then forwards the forward RM cell toward the destination (line 716).

The pseudo-code for the table_update subroutine for updating VC table entries in lines 705, 710, and 714 is shown in lines 724–733, where a temporary advertised rate $\mu_l^1$ is calculated (line 726) by implementing the pseudo-code of FIG. 6. Any marked sessions having a corresponding CCR variable value greater than or equal to the temporary advertised rate $\mu_l^1$ are unmarked (line 727). The updated advertised rate $\mu_l$ is calculated by implementing the pseudo-code of FIG. 6 (line 728). For a case where the temporary advertised rate $\mu_l^1$ is greater than the updated advertised rate $\mu_l$ (line 729), any marked sessions having a CCR value greater than or equal to the updated advertised rate $\mu_l$ are unmarked (line 730). For this case, the updated advertised rate $\mu_l$ is then re-calculated by implementing the pseudo-code of FIG. 6 (line 731). The calculation of the temporary advertised rate $\mu_l^1$ in line 726 and the repeated calculations of the updated advertised rate $\mu_l$ that occur in lines 728–731 are performed to ensure that after the switch processing algorithm completes for each received RM cell traversing a link, a marked session has its rate strictly less than the advertised rate (GMM-bottleneck link rate) of the link.

For the second case, the switch receives a backward RM cell for session i from a destination (lines 719–720). The field value for ER in the backward RM cell is set to the maximum of either 1) the lesser of the current ER field value and the current advertised rate $\mu_l$ of the link or 2) the MCR field value (line 721). The backward RM cell is then sent toward the source (line 722).

Comparison of Centralized and Distributed Flow Control

Figure 8:
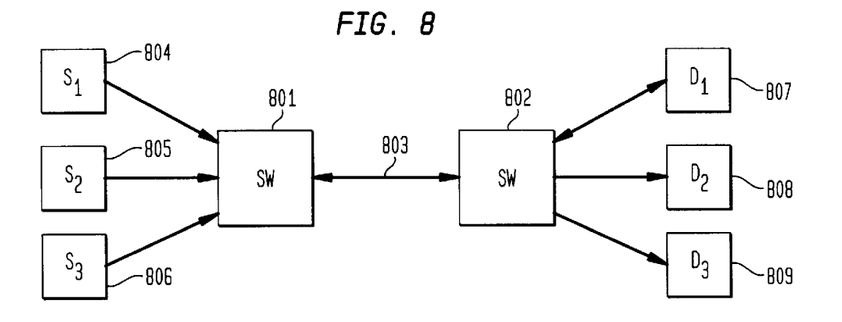
FIG. 8 shows an exemplary peer-to-peer network employing the centralized flow control algorithm in accordance with the present invention.

The following illustrates an example of the first embodiment employing the algorithm of FIG. 3. For an example of a peer-to-peer network configuration as shown in FIG. 8 with three sessions, the output port link of SW 801 (link 803) is assumed to be the only link that may cause a bottleneck. Also, all links have unit capacity. The $MCR_S$ and $PCR_S$ requirements for sessions s1–s3 are listed in Table 1.

TABLE 1

| Session | $MCR_s$ | $PCR_s$ | GMM Rate Allocation |
|---------|---------|---------|---------------------|
| s1      | 0.40    | 1.00    | 0.40                |
| s2      | 0.10    | 0.25    | 0.25                |
| s3      | 0.05    | 0.50    | 0.35                |

In step 301 of FIG. 3, each session s is assigned a rate corresponding to its $MCR_S$. The sessions are sorted into a list in increasing order of $MCR_S$ in step 302 (i.e., s3, s2, and s 1). In step 303, since the rate of s3 (0.05) is the smallest among all sessions, the algorithm begins with session s3. In step 304, the assigned rate of s3 is increased until the rate reaches the second smallest $MCR_S$, which is rate 0.1 of s2 (the test of step 305 returns a yes). Since the sessions s1, s2, and s3 remain (the test of step 309), the algorithm returns to step 304. The rates of both s2 and s3 being equal (each being 0.1), the rates of both sessions are increased in step 304, until s2 reaches its PCR constraint of 0.25 (the test of step 307 returns a yes).

Consequently, the algorithm proceeds to step 308 and the session s2 is removed from the list (with an assigned rate of 0.25) from future iterations of the algorithm. Sessions s1 and s3, now have assigned rates of 0.40 and 0.25, respectively, with the remaining capacity of link 805 being 0.10. The algorithm returns to step 304 since step 309 determines that s1 and s3 remain in the list. At step 304, only the rate of s3 is increased to 0.35, since s3 has a smaller rate (0.25) than s1 (0.4). The rate of s3 is increased to 0.35, when the capacity of link 803 is reached (i.e., link 803 saturates). Consequently, at step 306, the test determines that the link is saturated, and the sessions s1 and s3 are removed from the list at step 310 (with assigned rates of 0.4 and 0.35, respectively). The program reaches the end when step 309 determines that no further sessions remain in the list. The final rate allocation for the exemplary network is 0.40, 0.25, and 0.35 for s1, s2, and s3, respectively.

The example of the first embodiment illustrates that the generalized max-min (GMM) rate allocation of the present invention maximizes the minimum rate among all sessions, while satisfying each session's MCR and PCR requirements. For the example and based on the GMM-bottleneck link rate calculation of equation (4), the GMM-bottleneck link rate at link 803 is 0.35.

The distributed flow control algorithm of the present invention may be simulated using network modeling techniques. The exemplary simulations illustrate the convergence properties of the distributed flow control algorithm of the present invention. The simulation results as described subsequently are of a generic fairness network configuration as shown in FIG. 9.

Figure 9:
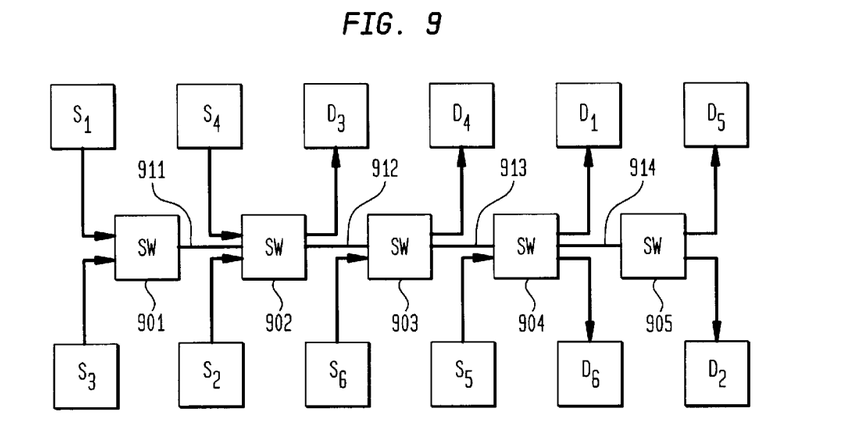
FIG. 9 shows a generic fairness network employing the distributed flow control algorithm in accordance with the present invention.

The specific generic fairness network configuration of FIG. 9 employs five ATM switches (SWs) 901–905 connected in a chain with links 911–914 providing six session paths for six source-destination pairs $S_1$-$D_1$, $S_2$-$D_2$, $S_3$-$D_3$, $S_4$-$D_4$, $S_5$-$D_5$, and $S_6$-$D_6$. The session paths traverse through the SWs 901–905 and share link capacity of links 911–914 between the SWs 901–905. Each of the five SWs 901–905 have output port buffers with a speedup factor equal to the number of ports. Each output port of an ATM switch (SWs 901–905) employs the simple FIFO queuing discipline, and its output port is shared by all virtual circuits (sessions) traversing through that port. Table 2 lists the $MCR_S$, $PCR_S$, and GMM rate allocation values for each session si, $1 \leq i \leq 6$, for the generic fairness network configuration.

TABLE 2

| Session | MCR | PCR | GMM Rate Allocation |
|---------|------|------|---------------------|
| s1 | 0.05 | 0.50 | 0.35 |
| s2 | 0.10 | 0.25 | 0.25 |
| s3 | 0.15 | 1.00 | 0.65 |
| s4 | 0.05 | 0.15 | 0.15 |
| s5 | 0.35 | 1.00 | 0.75 |
| s6 | 0.40 | 0.60 | 0.40 |

Table 3 lists parameters employed for the simulation. The link speed is set to 150 Mbps. For stability, the target link utilization is set to 0.95. The link capacity $C_l$ is 142.5 Mbps (0.95×150 Mbps) at every link l∈L to determine the explicit cell rate (ER). The distance to an ATM switch from either a source or a destination is 1 km, and the link distance between ATM switches is 1000 km. This configuration corresponds to that of a wide area network. The propagation delay is set to 5 μs per km.

TABLE 3

| End System | PCR | PCR |
|------------|-----|------|
| | MCR | MCR |
| | ICR | MCR |
| | Nrm | 32 |
| Link | Speed | 150 Mbps |
| Switch | Cell Switching Delay | 4 μs |

Figure 10:
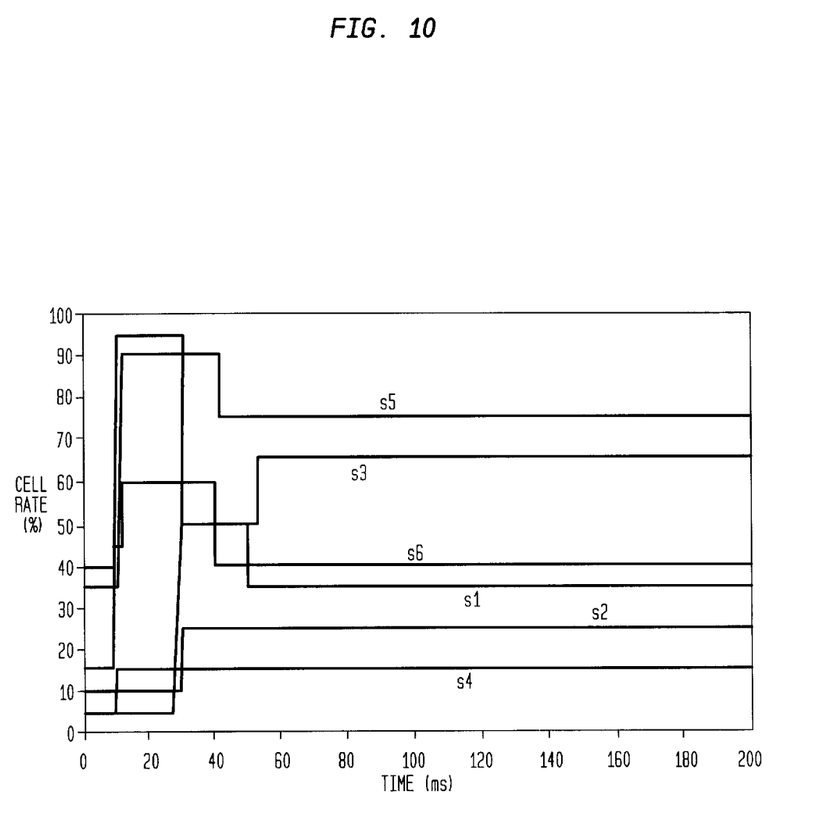
FIG. 10 shows simulation results of the exemplary distributed flow control algorithm of the present invention.

FIG. 10 shows the simulation results for the allowed cell rate (ACR) at a source for each session si as a function of time. The cell rates shown in the graph are normalized with respect to the targeted link capacity $C_l$ (142.5 Mbps). This normalization allows comparison of the GMM rate allocations shown in Table 2 with the example of the centralized flow control algorithm using unit link capacity. Referring to FIG. 10, each session starts to transmit at its MCR. After the initial iterations (less than 60 ms) of the distributed flow control algorithm, the ACR of each session si converges to the GMM rate allocation listed in Table 2. The maximum round trip time (RTT) among all sessions is 30 ms (s1 and s2), and a period of less than 2 RTT (60 ms) is required for the GMM rate allocation (assigned rates) of the distributed flow control algorithm to converge.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of allocating available capacity of a link of a packet network to one or more sessions, each session having a minimum rate and a peak rate, comprising the steps of:

(a) sorting the one or more sessions into an ordered list by assigning a current rate to each session based on the corresponding minimum rate and determining an available capacity of the link taking into account the current rate of each session;

(b) selecting a session having the lowest current rate of the list that is defined as the session having the lowest rate of first, second, and third values, wherein, for a given session,
the first value is the difference between the given session and an adjacent session in the list,
the second value is the remaining bandwidth of a link corresponding to the given session, and
the third value is the difference between the peak rate and current rate of the given session;

(c) increasing the current rate of the selected session if there is sufficient available capacity in the link and updating the available capacity based on the increased current rate;

(d) updating the list of one or more sessions and, if either the current rate of the selected session has reached the corresponding peak rate of the session or the available capacity of the link is exhausted, then assigning the increased current rate to the session; and (e) repeating steps (b) through (e) until a rate has been assigned to each session.

2. The method as recited in claim 1, wherein the method is a central rate allocation method and the available capacity is a remaining capacity of the link; and wherein step (a) comprises the step of assigning the current rate of each session as the corresponding minimum rate;

step (b) comprises the step of sorting the sessions in increasing order of current rate assigned in step (a); and, step (d) comprises the step of assigning the corresponding current rate for all sessions of the link if the rate of the session increased is equal to the remaining capacity.

3. The method as recited in claim 2, wherein the method is employed in a packet network operating in accordance with an Asynchronous Transfer Mode (ATM) standard, the session includes ATM cells, and the minimum rate and peak rate of the session are a minimum cell rate and a peak cell rate, respectively, of the session.

4. The method as recited in claim 1, wherein the method is a distributed rate allocation method, the session traverses the link of at least one node between a source and a destination and the session includes a resource control packet; and wherein, for step (a), the current rate of the session is assigned as an initial rate by the source, the source forwarding the resource control packet toward the destination through the node with the values of the current rate, the minimum rate, and the peak rate;

wherein step (b) includes the steps of:
(b1) calculating as the available capacity an advertised rate for the link based on the capacity of the link, a number of sessions of the link, and the current rate of each session,
(b2) marking each session of the link having a current rate less than the advertised rate,
(b3) forwarding the resource control packet to the destination, and
(b4) forwarding, by the destination, the resource control packet toward the source received from the node, and wherein step (d) includes the steps of:
(d1) determining an explicit rate as the greater of 1) the minimum rate and 2) the lesser of the peak rate and the advertised rate,
(d2) forwarding, by the node, the resource control packet having the explicit rate toward the source, and
(d3) assigning, by the source, the current rate as the explicit rate of the resource control packet.

5. The method as recited in claim 4, wherein step (d) further includes the steps of recalculating the advertised rate and unmarking each session having a current rate greater than or equal to the recalculated advertised rate.

6. The method as recited in claim 5, wherein the advertised rate is calculated in accordance with a session marking method, and each session is marked and unmarked, respectively, so that the rate of a marked session is strictly less than the advertised rate.

7. The method as recited in claim 5, wherein, if the link is in a saturated state, each session is marked if the session attains a corresponding GMM-bottleneck link rate on different link.

8. The method as recited in claim 5, wherein the method is employed in a packet network operating in accordance with an Asynchronous Transfer Mode (ATM) standard; the session includes ATM cells and the resource control packet is a resource management cell; and the minimum rate and peak rate of the session are a minimum cell rate and a peak cell rate, respectively.

9. A router for allocating available capacity of a link of a packet network to one or more sessions, each session having a minimum rate and a peak rate and each session assigned current rate based on the corresponding minimum rate, comprising:

a processor sorting the one or more sessions into an ordered list by assigning a current rate to each session based on the corresponding minimum rate and determining an available capacity of the link taking into account the current rate of each session;

the processor selecting a session based on the lowest current rate of the list that is defined as the session having the lowest rate of first, second, and third values, wherein, for a given session,
the first value is the difference between the given session and an adjacent session in the list,
the second value is the remaining bandwidth of a link corresponding the given session, and
the third value is the difference between the peak rate and the current rate of the given session;

the processor increasing the current rate of the session if there is sufficient available capacity in the link and updating the available capacity based on the increased current rate;

the processor updating the list of one or more sessions and assigning the increased current rate to the session if the current rate of the selected session has reached the corresponding peak rate of the session or the available capacity of the link is exhausted, and wherein the processor continues to select and increase the current rate of each session until a rate of each session is assigned.

10. The invention as recited in claim 9, wherein the available capacity is a remaining capacity of the link and the current rate of each session is assigned as the corresponding minimum rate; and wherein:

the processor sorts the sessions in an increasing order of rate assigned by the assigning means; and wherein the processor assigns the rate of all sessions of the link if the current rate of the session equals to the remaining capacity, and the processor assigns the current rate of each session when the current rate is the corresponding peak rate of the session.

11. The invention as recited in claim 10, wherein the router is included in a packet network operating in accordance with an Asynchronous Transfer Mode (ATM) standard, the session includes ATM cells, and the minimum rate and peak rate of the session are a minimum cell rate and a peak cell rate, respectively, of the session.

12. The invention as recited in claim 9, wherein the session traverses the link of at least one node between a source and a destination and the session includes a resource control packet; and the current rate of the session is assigned as an initial rate by the source, the source forwarding the resource control packet toward the destination through the node with the values of the current rate, the minimum rate, and the peak rate; and wherein:

the processor selects each session by:
(1) calculating as the available capacity an advertised rate for the link based on the capacity of the link, a number of sessions of the link, and the current rate of each session, (2) marking each session of the link having a current rate less than the advertised rate, (3) forwarding the resource control packet to the destination, and (4) forwarding, by the destination, the resource control packet toward the source received from the node; and the determining means determines whether the rate of the session is equal to the corresponding peak rate of the session or the available capacity of the link by:

i) determining an explicit rate as the greater of 1) the minimum rate and 2) the lesser of the peak rate and the advertised rate, ii) forwarding, by the node, the resource control packet having the explicit rate toward the source, and iii) assigning, by the source, the explicit rate of the resource control packet as the current rate.

13. The invention as recited in claim 12, wherein the determining means recalculates the advertised rate and unmarks each session having a current rate greater than or equal to the recalculated advertised rate.

14. The invention as recited in claim 13, wherein the advertised rate is calculated in accordance with a session marking method, and each session is marked and unmarked, respectively, so that the rate of a marked session is strictly less than the advertised rate.

15. The invention as recited in claim 13, wherein, if the link is in a saturated state, each session is marked if the session attains a corresponding GMM bottlenecked link rate on a different link.

16. The invention as recited in claim 13, wherein the router is included in a packet network operating in accordance with an Asynchronous Transfer Mode (ATM) standard; the session includes ATM cells and the resource control packet is a resource management cell; and the minimum rate and peak rate of the session are a minimum cell rate and a peak cell rate, respectively.

17. A computer-readable medium having stored thereon a plurality of instructions, the plurality of instructions including instructions which, when executed by a processor, cause the processor to implement a method of allocating available capacity of a link of a packet network to one or more sessions, each session having a minimum rate and a peak rate, the method comprising the steps of:

(a) sorting the one or more sessions into an ordered list by assigning a current rate to each session based on the corresponding minimum rate and determining an available capacity of the link taking into account the current rate of each session;

(b) selecting a session having the lowest current rate of the list is defined as the session having the lowest rate of first, second, and third values, wherein, for a given session, the first value is the difference between the given session and an adjacent session in the list, the second value is the remaining bandwidth of a link corresponding the given session, and the third value is the difference between the peak rate and the current rate of the given session;

(c) increasing the current rate of the selected session if there is sufficient available capacity in the link and updating the available capacity based on the increased current rate;

(d) updating the list of one or more sessions and, if either the current rate of the selected session has reached the corresponding peak rate of the session or the available capacity of the link is exhausted, then assigning the current rate to the session; and (e) repeating steps (b) through (d) until a rate has been assigned to each session.

* * * * *